United States Patent [19]

Cucinotta et al.

[11] Patent Number: 5,207,007
[45] Date of Patent: May 4, 1993

[54] SET-UP TOOL

[76] Inventors: Anthony J. Cucinotta, 38 Sweetser St., Wakefield, Mass. 01880; George A. Bond, 33 Pratt St., Billerica, Mass. 01821

[21] Appl. No.: 797,373

[22] Filed: Nov. 25, 1991

[51] Int. Cl.$^5$ .................... B23Q 17/22; B27G 23/00
[52] U.S. Cl. ............................... 33/640; 33/626; 33/534; 83/522.16
[58] Field of Search ............. 33/832, 833, 201, 202, 33/534, 535, 626, 633, 634, 632, 635, 640; 83/522.15, 522.16, 522.22, 522.24, 522.25

[56] References Cited

U.S. PATENT DOCUMENTS

| | | | |
|---|---|---|---|
| 2,542,470 | 2/1951 | Booth | 33/534 |
| 2,823,461 | 2/1958 | Schnieder | 33/202 |
| 2,884,965 | 5/1959 | Stahl | 33/640 |
| 3,382,582 | 5/1968 | Matson | 33/535 |
| 3,628,496 | 12/1971 | Schmitt | 33/640 |
| 4,406,069 | 9/1983 | Clement | 33/535 |
| 4,584,774 | 4/1986 | Link | 33/633 |
| 4,779,354 | 10/1988 | Hill | 33/640 |
| 4,976,046 | 12/1990 | Lee et al. | 33/640 |
| 5,042,542 | 8/1991 | Purviance | 33/201 |
| 5,058,284 | 10/1991 | Stevenson | 33/535 |

FOREIGN PATENT DOCUMENTS

0201101  8/1989  Japan .................... 33/535

*Primary Examiner*—Thomas B. Will

[57] ABSTRACT

A set-up tool is provided for use with a working tool, such as a power saw, that works near a surface (18) having a miter slot. The set-up tool includes a dial indicator (6) and mounting members (2, 4) which mount the dial indicator in a measuring position above the surface. One of the mounting members (4) fits into the miter slot on the surface. The dial indicator is moveable with respect to the mounting member (4) that fits into the miter slot. A locking screw (3) is provided for selectively locking the dial indicator in a desired location relative to the mounting member (4).

8 Claims, 11 Drawing Sheets

| ANGLE | BLADE TILT | MITER GAUGE* |
|---|---|---|
| 0° | 0.000" | 0.000" |
| 1° | 0.018" | 0.009" |
| 2° | 0.035" | 0.018" |
| 3° | 0.052" | 0.026" |
| 4° | 0.070" | 0.035" |
| 5° | 0.088" | 0.044" |
| 6° | 0.105" | 0.053" |
| 7° | 0.123" | 0.061" |
| 8° | 0.141" | 0.070" |
| 9° | 0.158" | 0.079" |
| 10° | 0.176" | 0.088" |
| 11° | 0.194" | 0.097" |
| 12° | 0.213" | 0.106" |
| 13° | 0.231" | 0.115" |
| 14° | 0.249" | 0.124" |
| 15° | 0.268" | 0.134" |
| 16° | 0.287" | 0.143" |
| 17° | 0.306" | 0.153" |
| 18° | 0.325" | 0.163" |
| 19° | 0.344" | 0.172" |
| 20° | 0.364" | 0.182" |
| 21° | 0.383" | 0.192" |
| 22° | 0.404" | 0.202" |
| 22.5° | 0.414" | 0.207" |
| 23° | 0.424" | 0.212" |
| 24° | 0.445" | 0.223" |
| 25° | 0.466" | 0.233" |
| 26° | 0.488" | 0.244" |
| 27° | 0.510" | 0.255" |
| 28° | 0.532" | 0.266" |
| 29° | 0.554" | 0.277" |
| 30° | 0.577" | 0.289" |
| 31° | 0.601" | 0.301" |
| 32° | 0.625" | 0.313" |
| 33° | 0.649" | 0.325" |
| 34° | 0.675" | 0.337" |
| 35° | 0.700" | 0.350" |
| 36° | 0.726" | 0.363" |
| 37° | 0.754" | 0.377" |
| 38° | 0.781" | 0.390" |
| 39° | 0.810" | 0.405" |
| 40° | 0.839" | 0.419" |
| 41° | 0.869" | 0.435" |
| 42° | 0.900" | 0.450" |
| 43° | 0.932" | 0.466" |
| 44° | 0.966" | 0.483" |
| 45° | 1.000" | 0.500" |
| | | *Meas. using 0.500" spacer block |

FIG. 16

SET-UP TOOL

BACKGROUND OF THE INVENTION

1. Field of the Invention

The invention relates to a tool that allows for mounting and positioning a dial indicator in a miter slot on a woodworking tool surface that contains a miter slot that is integral to the woodworking equipment or is added to that equipment. The use of this tool in this manner allows the woodworker to set up his equipment and conduct projects with a precision and ease not available at this time.

2. Description of Prior Art

Setting up a saw blade on a table saw is currently more art than science. Current methods include use of right angles(squares), angle blocks, spacers rulers, protractors, homemade jigs and dial indicators mounted on a magnetic base. All of these methods require a substantial amount of trial and error measurements and the results are less than acceptable. The dial indicator on a magnetic base is unwieldy, offers no repeatability from set up to set up and it requires a magnetic base. This argument also applies to drill presses, table mounted routers, band saws, jointers and planers. This invention eliminates all these problems.

SUMMARY OF THE INVENTION

The invention is a tool that allows the woodworker to set up his equipment and projects with ease, accuracy and repeatability that is not currently available. It consist of a dial indicator mounted in a specific format that results in accurate measurements and set ups of parallelness, flatness, angles, trueness, thickness, depth of dadoes, spacing of dadoes, depth and spacing of router cuts, depth and spacing of holes, depth and spacing of box joints and cutting of veneer. All of these measurements can be performed with precision to less than one thousandth of an inch repeatably.

The object of the invention is to provide a relatively inexpensive device that allows for more efficient and novel use of a dial indicator, increases productivity, accuracy, minimizes waste and increases safety.

DESCRIPTION OF THE PREFERRED EMBODIMENT

Figure 1:
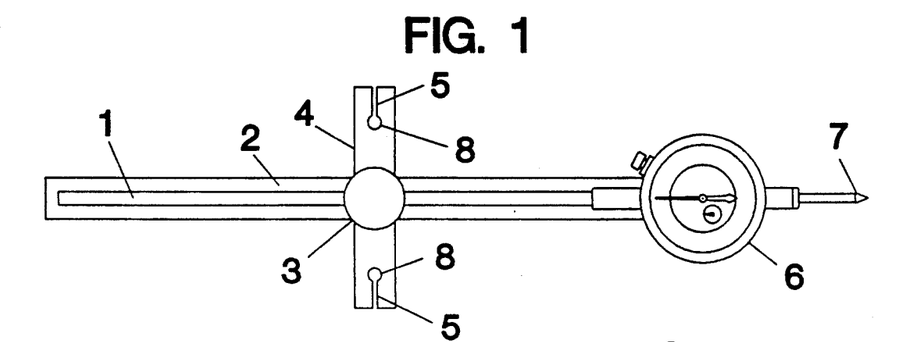
FIG. 1 is a top view of the embodiment of the Set-Up Tool with dial indicator.

Referring to FIGS. 1,2,3,4, and 6, an embodiment of the invention is shown with the dial indicator 6 mounted and not mounted. FIG. 1 is comprised of a slotted shaft 2 with the slot 1 which slides along an adjustable miter bar 4. The shaft 2 is secured by a knurled headed and threaded screw 3 which when loosened allows the shaft to slide the length of the slotted shaft 2.

Figure 2:
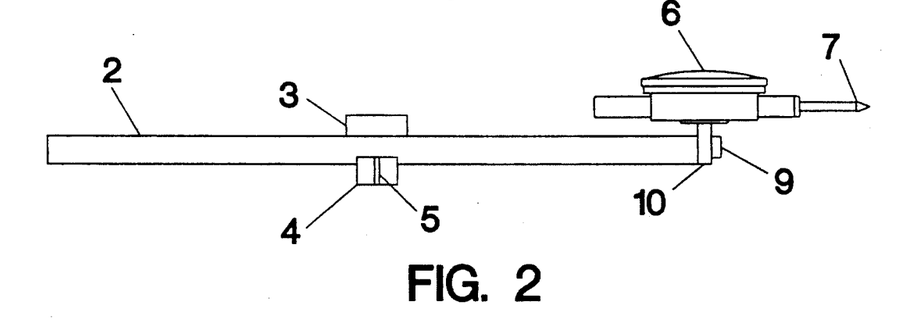
FIG. 2 is a side view of the embodiment of the Set-Up Tool with dial indicator.

FIGS. 1 and 2 demonstrate how the dial indicator 6 is mounted by means of a threaded screw 9 (FIG. 2) through a mounting bracket 10 (FIG. 2) and into the shaft 2.

Figure 3:
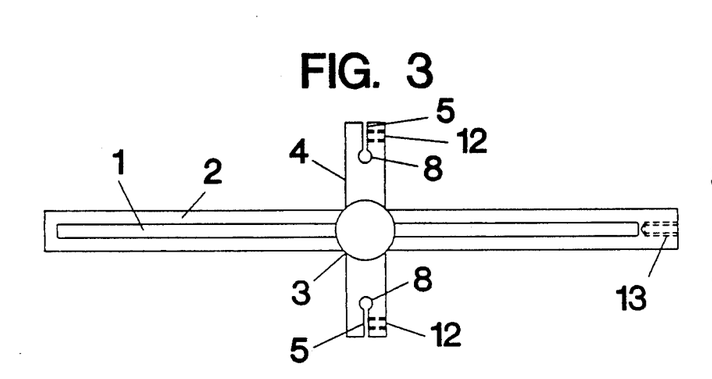
FIG. 3 is a top view of the embodiment of the Set-Up Tool without the dial indicator.
Figure 4:
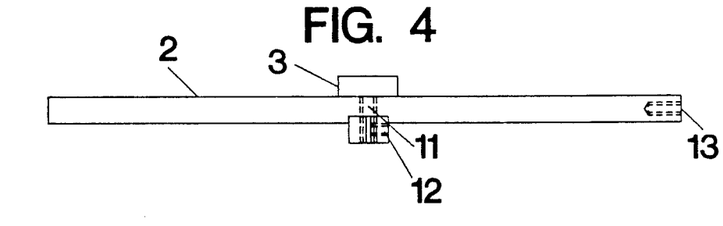
FIG. 4 is a side view of the embodiment of the Set-Up Tool without the dial indicator.
Figure 5:
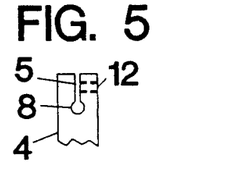
FIG. 5 is a expanded view detailing points 4, 5, 8, and 12 in FIG. 3.
Figure 6:
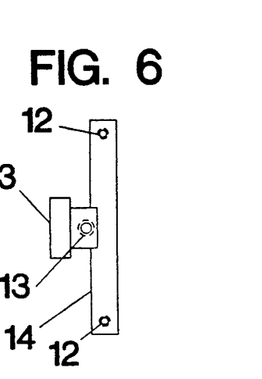
FIG. 6 is a front view of the embodiment of the Set-Up Tool without the dial indicator.

They also show two slots 5 and two holes 8 (FIG. 1). These are used to adjust the width of the miter bar 4 to accommodate miter slot width variations that are not made to specification or are worn down through use. FIGS. 3 and 4 show the cross section of the hole with a set screw 12 that on tightening into slot 5 adjusts the bar thickness up to thirty thousandths depending on material of construction and on loosening returns to original size. This adjustable miter bar 4 allows the assembled tool to fit in a miter slot with no measurable side to side movement and yet slide smoothly so as not to affect dial indicator 6 readings. FIG. 5 is an expanded view of adjustable feature shown in FIGS. 3 and 4. FIG. 6 shows front view of FIGS. 3 and 4 including set screws 12.

Figure 16:
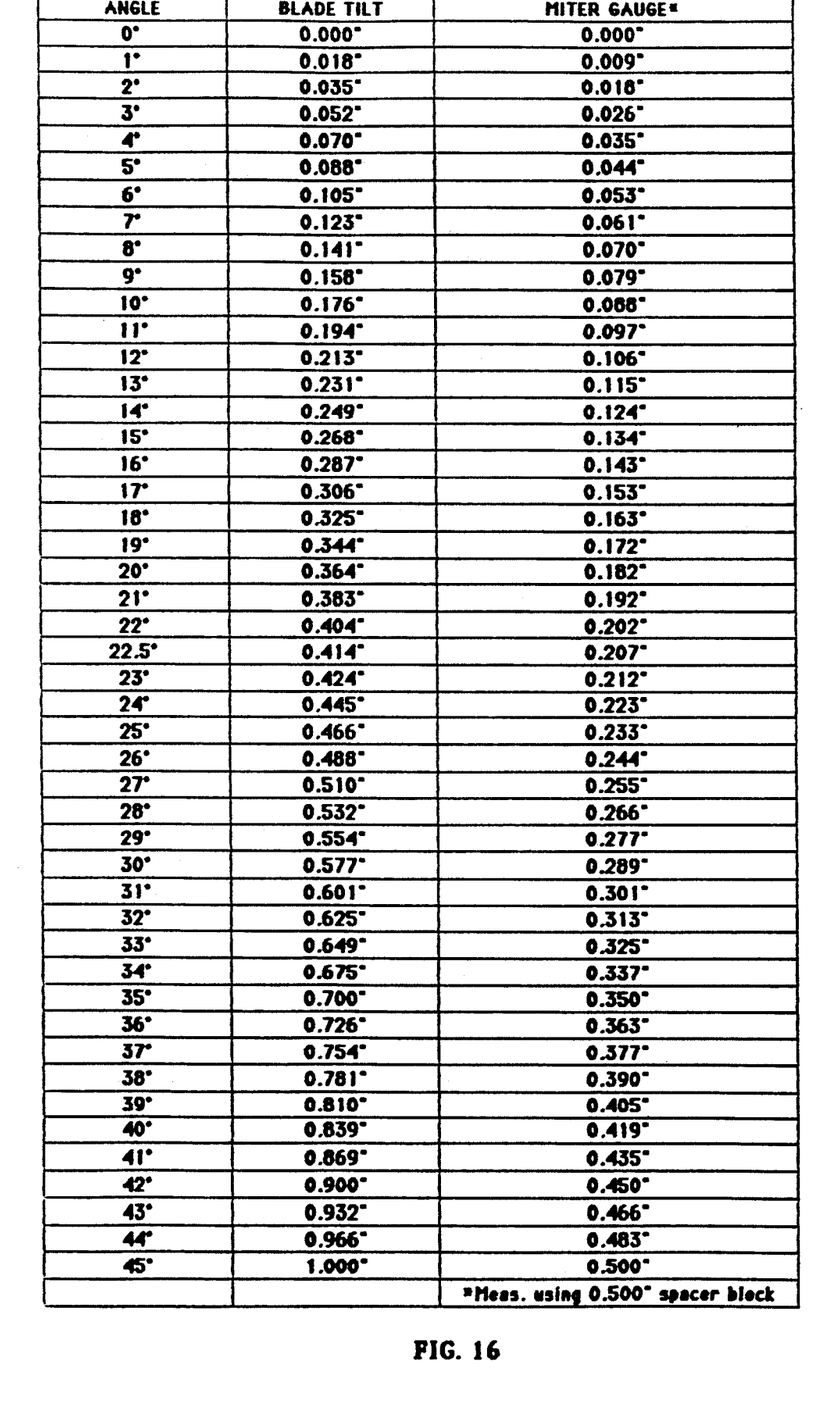
FIG. 16 is a table for converting dial indicator readings to angles for blade calibration and set up and for miter gauge calibration and set up.

FIGS. 3 and 4 also show a cross section of a threaded hole 13 that allows the dial indicator to be mounted at a specific distance above the woodworking surface. This novel feature is crucial to the proper measurement of angles. Referring to FIGS. 8 and 9, detail 21 is a distance of one inch plus or minus three thousandths. This feature allows the indicator tip 7 to contact the surface of the saw blade 19 at a fixed height which is directly related to angle of that surface by the tangent of that angle. That is, on placing the indicator tip 7 against that surface of the saw blade 19 and zeroing out the dial indicator you can adjust the blade perpendicular to the working surface 18 in FIGS. 7 and 8 to one tenth of one degree from ninety degrees. After this is done the blade can be adjusted to one tenth of one degree from ninety degrees to forty five degrees as measured from the working surface 18 (throat plate 20 is part of surface) or conversely from zero to forty five degrees as measured from the blade. FIG. 16 is the conversion table for this measurement 15 on FIGS. 8 and 9 is shortened view of side of table.

Figure 7:
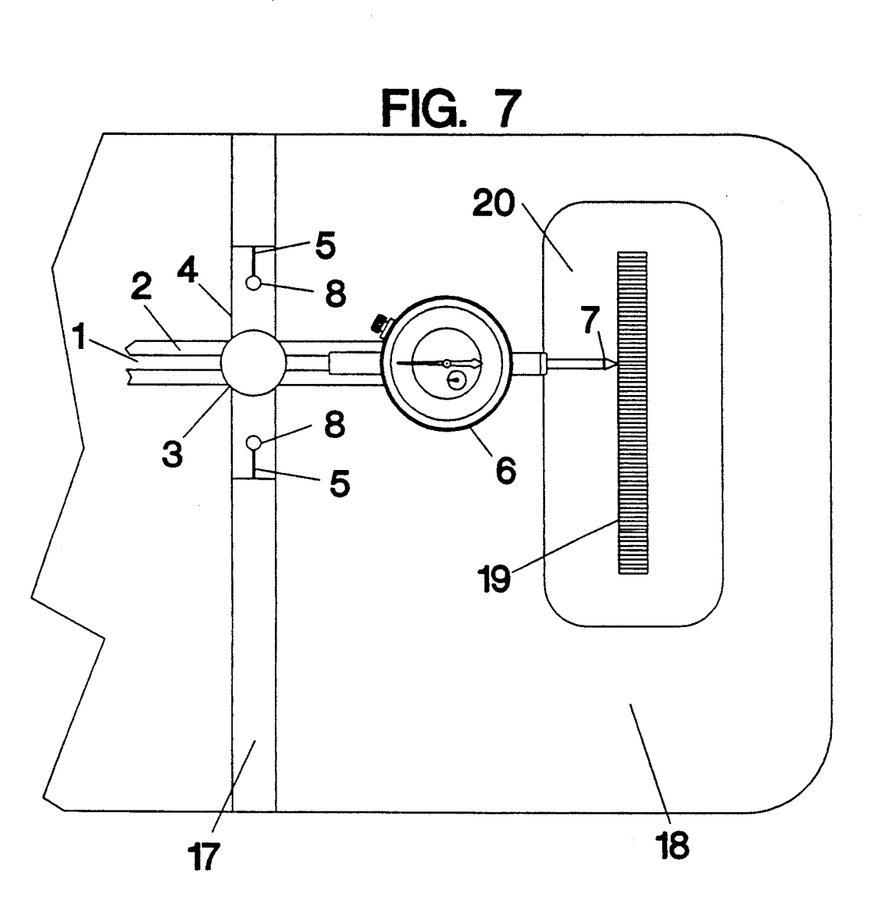
FIG. 7 is a top view of the embodiment of the Set-Up Tool with dial indicator showing the positioning of the indicator tip in relation to the saw blade.
Figure 8:
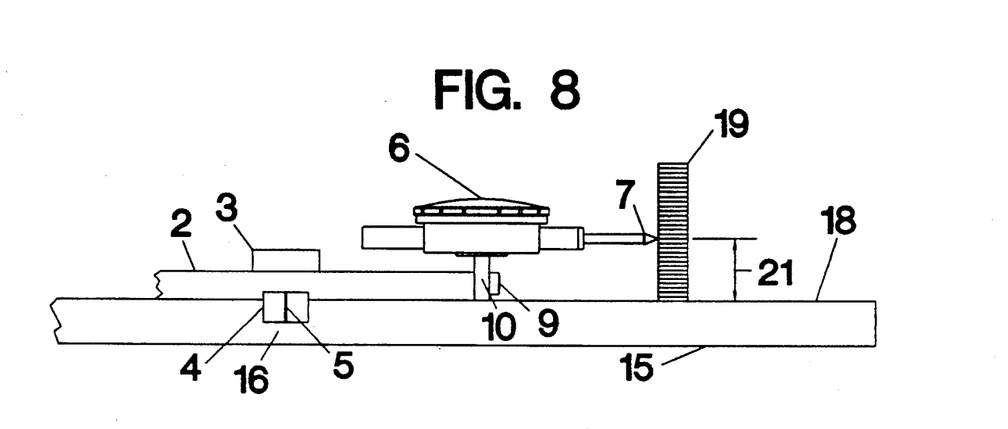
FIG. 8 is a side view of the embodiment of the Set-Up Tool with dial indicator showing the positioning and height of the indicator tip in relation to the saw blade.
Figure 9:
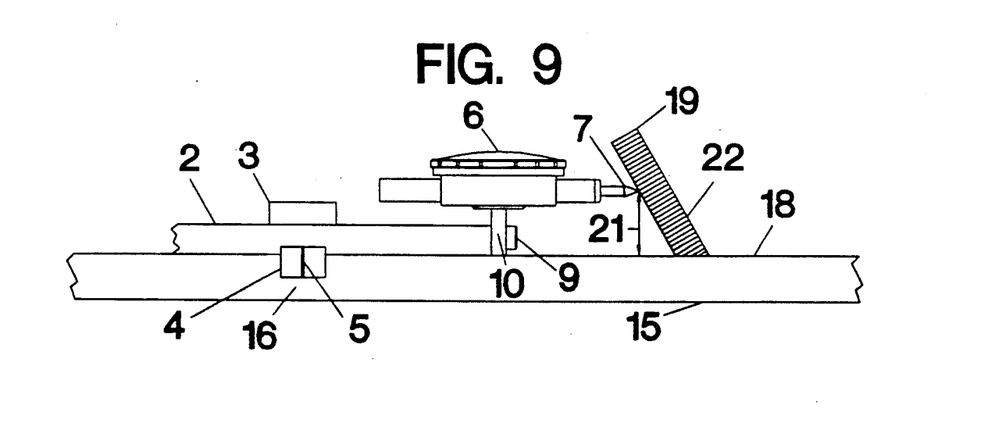
FIG. 9 is a side view of the embodiment of the Set-Up Tool with dial indicator showing the positioning and height of the indicator tip in relation to the saw blade at an angle other than ninety degrees.

An example of how this works is as follows:

(1) Place the SET-UP TOOL in the miter slot 17 on FIGS. 7 and 8. 16 is side view of miter slot (2) Loosen threaded knob 3, slide shaft 2 until indicator tip just touches the blade surface 19, tighten knob 3 and zero out the dial indicator (3) Check if the blade is perpendicular to the working surface by making a trial cut on a piece wood and flipping the cut piece one hundred and eighty degrees and matching the ends for fit. If there is any gap the blade must be adjusted by one half the distance of that gap. If a gap exists you can measure with a set of calipers or estimate it by eye. If the measurement or estimate is for example is twenty thousandths, then adjust the blade in the proper direction ten thousandths and this will bring the blade closer to perpendicular than any other tool. This can be repeated with another trial cut but usually one cut is enough.

(4) After the blade is set perpendicular, any angle between ninety and forty five degrees is easily set as never before. If it is desired to make an eighty nine degree cut to the table or a one degree cut from the blade, just adjust the blade 19 which has the indicator tip 7 in contact, eighteen thousandths of an inch, which is read from FIG. 16. FIG. 9 demonstrates tilted blade 22 and depressed tip 7. The cut will be within one tenth of one degree. Another example that demonstrates its ease and accuracy is in making polygons, again just refer to FIG. 16 and if it is desired to make an octagon. Just adjust the blade four hundred and four thousandths and the result is a twenty two and half degree angle.

Figure 10:
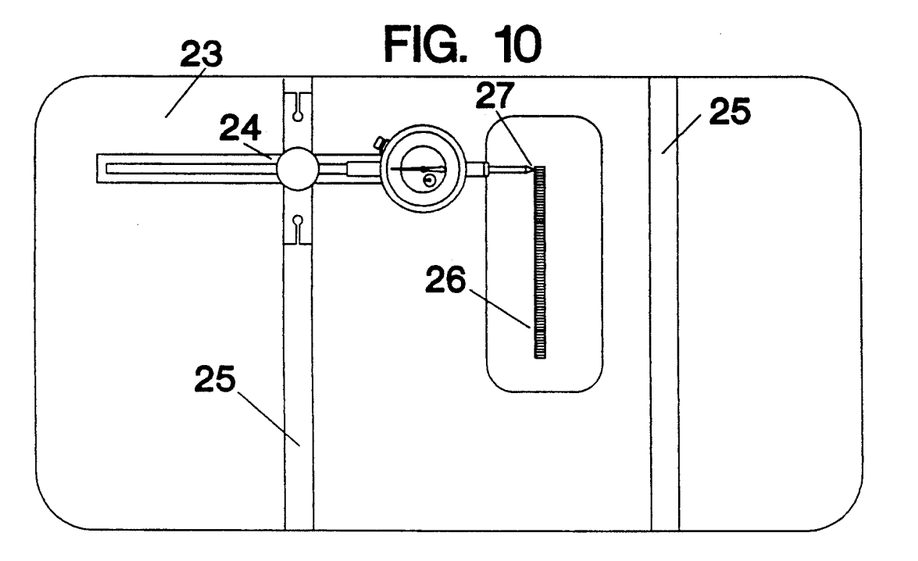
FIG. 10 is a top view of the embodiment of the Set-Up Tool with dial indicator showing the positioning of the indicator tip in relation to the saw blade teeth at the rear of the saw blade.
Figure 11:
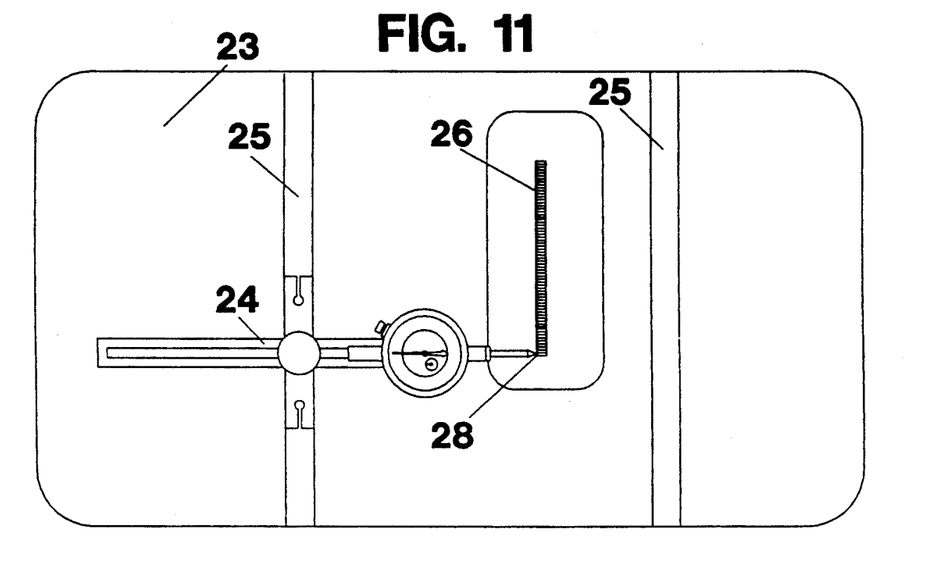
FIG. 11 is a top view of the embodiment of the Set-Up Tool with dial indicator showing the positioning of the indicator tip in relation to the saw blade teeth at the front of the saw blade.
Figure 12:
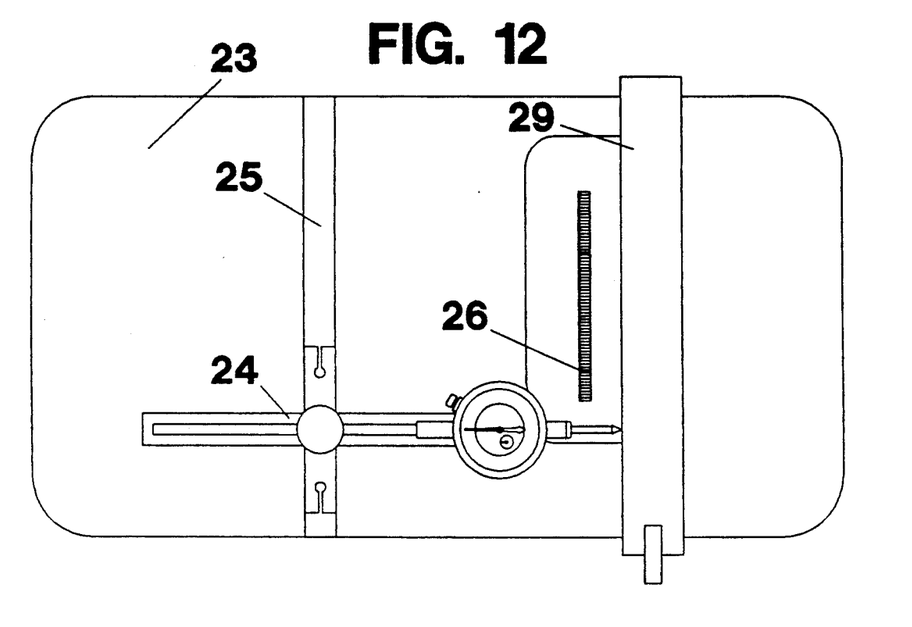
FIG. 12 is a top view of the embodiment of the Set-Up Tool with dial indicator showing the positioning of the indicator tip in relation to the fence at the rear of the fence.
Figure 13:
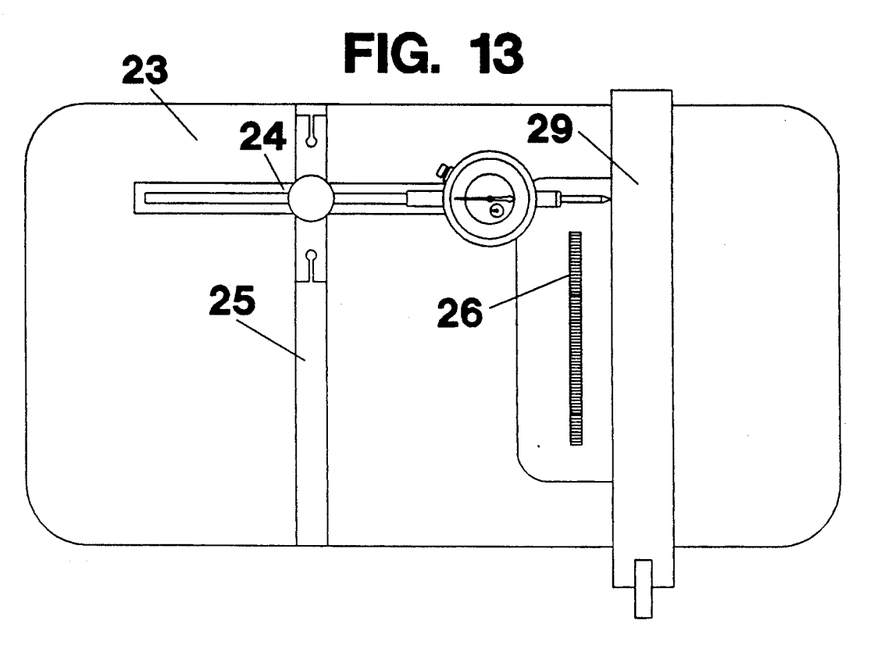
FIG. 13 is a top view of the embodiment of the Set-Up Tool with dial indicator showing the positioning of the indicator tip in relation to the fence at the front of the fence.

This example is typical of other methods of how this invention can be used in many different measurements and calibrations. FIG. 10 and 11 demonstrate how to calibrate the saw blade 26 in a smaller view so it is parallel to the miter slot 25. The indicator tip 7 is brought into contact with the saw tooth as shown at 27 in FIG. 10 and the indicator reading is noted. Then, the blade is rotated (the saw should be unplugged for safety for all measurements and calibrations) to 28 as shown in FIG. 11. Then, the miter bar 4 is moved to the position shown in FIG. 11 with the indicator tip 7 made to contact the saw tooth as shown at 28 and the reading is noted. The difference in the readings is used to set the blade parallel. The same is true for paralleling the fence 29—FIGS. 12 and 13. 23 is table surface and 24 is reduced view of FIG. 1.

Figure 14:
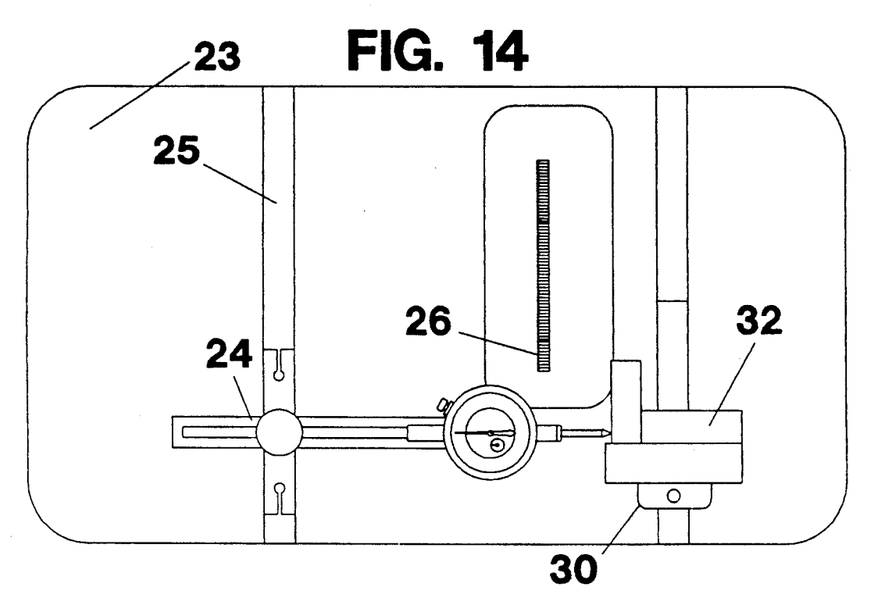
FIG. 14 is a top view of the embodiment of the Set-Up Tool with dial indicator showing the positioning of the indicator tip in relation to the miter gauge and the right angle(square) in place.
Figure 15:
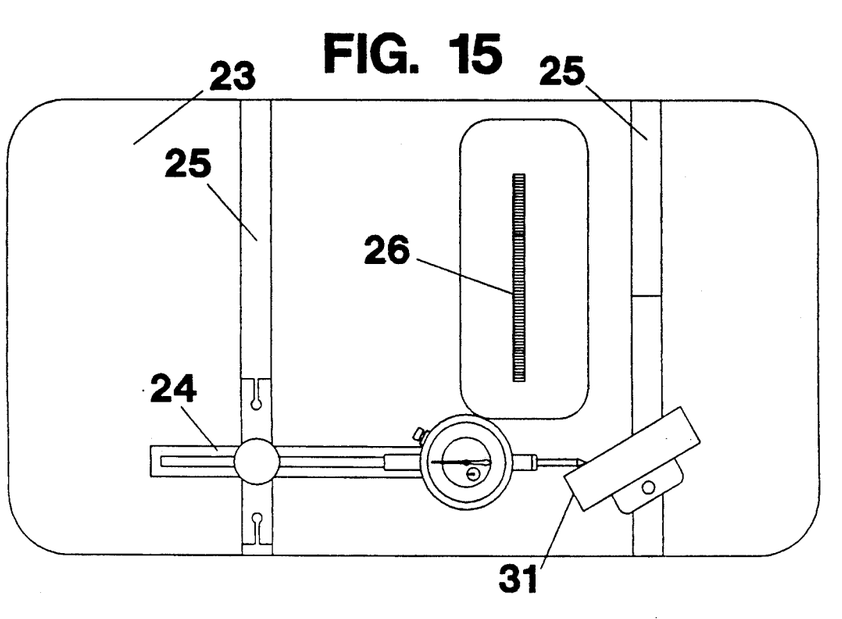
FIG. 15 is a top view of the embodiment of the Set-Up Tool with dial indicator showing the positioning of the indicator tip in relation to the miter gauge and the miter gauge at an angle other than ninety degrees.

FIGS. 14 and 15 demonstrate how to calibrate the miter gauge for perpendicularity and for any angle from ninety degrees to forty five degrees. This is accomplished by setting a square 32 against the miter gauge and sliding either the invention or the miter gauge along the length of the square and noting the change. Any change more than two thousandths of an inch should be adjusted for. To calibrate an angle either set an angle block or use a stop that fits snugly in the miter slot 25 just behind or in front of the miter gauge and place a one half inch block in between miter gauge 31 and stop, remove one half inch block and slide miter gauge 31 to stop. It will have moved one half inch. Note the change in reading on the dial indicator and refer to FIG. 16 under MITER GAUGE. If the reading changed one half of an inch then the miter gauge is at forth five degrees. If it moved two hundred and eighty nine thousandths of an inch then the gauge is at sixty degrees(-complementary angle).

Although one detailed embodiment of the invention is illustrated in the drawings and previously described in detail, this invention contemplates any configuration and design of components which will accomplish the equivalent result. As an example the invention could be a set of round shafts passing through 3 rectangular blocks, located by two knobs. The adjustable miter bar 4 could be a slot through the entire length on the bottom of one of the blocks with set screws 12 on either or both ends or it could have an angled slot that is adjusted with a bolt through the top of the bar with an angled nut that on tightening pushes the bar apart. Another method could be two adjustable cams or bearings that on turning will adjust the miter slot 25 width. The mounting of the dial indicator at one inch or any other height could be accomplished by an adjustable screw or block is another example. Another configuration could use some other measuring instrument other than than the dial indicator such as a adjustable ruler, two sliding rulers, side mounted caliper or depth gauge, rotating round disc ruler or a digital readout instrument. An exotic application would mount a distance measuring laser.

I claim:

1. A set-up tool for use with a working tool that works near a surface having a miter slot, the set-up tool comprising:
   a dial indicator;
   mounting means for mounting the dial indicator in a measuring position above the surface, a first part of the mounting means fitting into the miter slot, the dial indicator being mounted on a second part of the mounting means which is moveable with respect to the first part of the mounting means that fits into the miter slot; and
   locking means for selectively locking the second part of the mounting means to the first part of the mounting means to locate the dial indicator at a desired location relative to the first part of the mounting means.

2. The set-up tool of claim 1, wherein:
   the first part of the mounting means is a bar member which fits into the miter slot and is parallel to the miter slot; and
   the second part of the mounting means is a shaft member upon which the dial indicator is mounted, the shaft member being mounted on top of the bar member and extending perpendicularly to the bar member, the shaft member being selectively moveable in a direction perpendicular to the bar member.

3. The set-up tool of claim 2, wherein the shaft member is centrally slotted, and wherein the locking means extends through the slot in the shaft member.

4. The set-up tool of claim 2, wherein the bar member is selectively movable along the miter slot.

5. The set-up tool of claim 2, wherein the bar member has width adjustment means for enabling it to fit into the miter slot.

6. The set-up tool of claim 1, wherein the dial indicator has an indicator tip and the dial indicator provides a reading indicative of a position of the indicator tip.

7. A set-up tool for use with a working tool that works near a surface having a miter slot, the set-up tool comprising:

a dial indicator;

a mount assembly for mounting the dial indicator in a measuring position above the surface, the mount assembly including a first mounting member which fits into the miter slot and a second mounting member which is carried by the first mounting member, the second mounting member being moveable with respect to the first member, the second mounting member having the dial indicator mounted thereon; and locking means for selectively locking the second mounting member in a desired location relative to the first mounting member.

8. The set-up tool of claim 7, wherein the second mounting member comprises a shaft member upon which the dial indicator is mounted, and wherein the locking means comprises a knurled headed fastener.

* * * * *